US00RE48998E

(19) United States
(12) Reissued Patent
Bae et al.

(10) Patent Number: US RE48,998 E
(45) Date of Reissued Patent: Mar. 29, 2022

(54) SYSTEM AND METHOD FOR RECALCULATING ANALYSIS REPORT OF 3D SCAN DATA

(71) Applicant: 3D Systems Korea, Inc., Seoul (KR)

(72) Inventors: Seock Hoon Bae, Los Altos, CA (US); Dong Hoon Lee, Goyang (KR); Seung Yob Kim, San Diego, CA (US); Sung Wook Cho, Gangnam-gu (KR)

(73) Assignee: 3D Systems, Inc., Rock Hill, SC (US)

(21) Appl. No.: 16/435,236

(22) Filed: Jun. 7, 2019

Related U.S. Patent Documents

Reissue of:
(64) Patent No.: 7,365,863
Issued: Apr. 29, 2008
Appl. No.: 11/284,181
Filed: Nov. 21, 2005

(30) Foreign Application Priority Data

Jun. 10, 2005 (KR) ..... 10-2005-0050072

(51) Int. Cl.
*G06T 1/00* (2006.01)

(52) U.S. Cl.
CPC ..... *G06T 1/00* (2013.01)

(58) Field of Classification Search
CPC ..... G06T 1/00; A61C 7/00; A61C 7/002
USPC ..... 382/309, 311; 256/601, 608
See application file for complete search history.

(56) References Cited

U.S. PATENT DOCUMENTS 5,504,847 A 4/1996 Kimura et al.
6,095,145 A * 8/2000 Sadlo ..... 128/844
6,438,263 B2 8/2002 Albeck et al.
6,633,836 B1 10/2003 Yamaura
6,641,537 B2 * 11/2003 Morris ..... A61B 8/0875 128/915
6,980,302 B2 * 12/2005 Knighton ..... G01B 11/2518 356/12
7,156,655 B2 * 1/2007 Sachdeva et al. ..... 433/24
7,209,136 B2 4/2007 Grau
7,215,430 B2 5/2007 Kacyra et al.
7,234,937 B2 * 6/2007 Sachdeva et al. ..... A61C 7/00 433/24
7,428,480 B2 9/2008 Deguchi
7,649,976 B2 1/2010 Georgeson et al.
7,761,266 B2 7/2010 Mangon et al.
(Continued)

FOREIGN PATENT DOCUMENTS

GB 2 402 765 12/2004
JP H06176107 6/1994
(Continued)

OTHER PUBLICATIONS

"Oxford Dictionary of Computing", Oxford University Press, 5th edition, 2004, 3pgs.

(Continued)

*Primary Examiner* — Kenneth Whittington

(57) ABSTRACT

Disclosed is a system and method for allowing analysis results of scan data to have supplemental geometry and various measurements generated from the supplemental geometry or mutual common relations between geometric tolerances, and when the scan data changes, the analysis results according to the related data are recalculated in real time in order to simplify the repetitive inspection process according to the scan data changes.

12 Claims, 5 Drawing Sheets

(56) References Cited

U.S. PATENT DOCUMENTS

| | | | | |
|---|---|---|---|---|
| 7,947,939 | B2 * | 5/2011 | Schrey | H04N 5/3575 250/208.1 |
| 8,036,450 | B2 | 10/2011 | Bertola et al. | |
| 8,259,101 | B2 | 9/2012 | Shimada et al. | |
| 2001/0055013 | A1 | 12/2001 | Fuki | |
| 2002/0006597 | A1 * | 1/2002 | Andreiko et al. | 433/24 |
| 2003/0071810 | A1 | 4/2003 | Shoov et al. | |
| 2004/0029068 | A1 * | 2/2004 | Sachdeva et al. | 433/24 |
| 2004/0115586 | A1 * | 6/2004 | Andreiko et al. | 433/3 |
| 2004/0136002 | A1 * | 7/2004 | Whaite et al. | 356/419 |
| 2005/0265598 | A1 * | 12/2005 | Noguchi et al. | 382/167 |

FOREIGN PATENT DOCUMENTS

| | | |
|---|---|---|
| JP | H08190575 | 7/1996 |
| JP | 2000205821 | 7/2000 |
| JP | 2001357088 | 12/2001 |
| JP | 2002071339 | 3/2002 |
| JP | 2002350122 | 12/2002 |
| JP | 2004286571 | 10/2004 |
| JP | 2005062148 | 3/2005 |
| JP | 03938687 | 4/2007 |

OTHER PUBLICATIONS

U.S. Appl. No. 11/284,180, filed Nov. 21, 2005, Seock Hoon Bae, et al.
U.S. Appl. No. 11/284,148, filed Nov. 21, 2005, Seock Hoon Bae, et al.
U.S. Appl. No. 11/284,182, filed Nov. 21, 2005, Seock Hoon Bae, et al.

* cited by examiner

SYSTEM AND METHOD FOR RECALCULATING ANALYSIS REPORT OF 3D SCAN DATA

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*RELATED APPLICATION*

*This is a reissue application of U.S. Pat. No. 7,365,863, filed Nov. 21, 2005, issued Apr. 29, 2008, and which claims the benefit of priority to Korean Patent Application No. 10-2005-0050072, filed Jun. 10, 2005.*

BACKGROUND OF THE INVENTION

1. Field of the Invention

The present invention relates to a system for recalculating an analysis report of 3D scan data, and more particularly, to a system and a method for recalculating an analysis report of 3D scan data according to mutually related data in real time when the scan data changes by allowing the defining of mutually common relations between supplemental geometry and various measurements generated from the supplemental geometry or geometric tolerances.

2. Description of the Related Art

Generally, measurement systems using 3D scanners include contact methods that directly contact a measurement object, and non-contact methods obtaining structural information about an object by digitizing a structure captured using imaging equipment.

Measurement systems employing 3D scanners are used to acquire structural information of measurement objects that are fragile when subjected to external pressures or high precision miniature components such as the manufacturing of semiconductor wafer, measuring of precision machinery, and the reconstruction of 3D images. Such measurement processes using 3D scanners first clamp an object to a holder on the 3D scanner, and obtain scan data of the object by scanning the structure of the object through the 3D scanner.

The obtained 3D scan data described above undergoes a predetermined analytic process to produce a report including numerical data and image data that a user can check.

However, such reports of the prior art display various scan results derived from the 3D scan data in the form of simple numerical values and fixed images; and in order to substitute new scan data for the previous, or change the scan parameters of the scan data, the entire operation must be started again from the beginning because there is no connection between the scan data and inspection items for analyzing the scan data.

Due to the above problem, work efficiency is compromised.

Accordingly, when a modification to the scan data of a 2D or 3D object is required, a technique for analyzing the scan data and efficiently and quickly recalculating the analysis results is needed.

SUMMARY OF THE INVENTION

Accordingly, the present invention is directed to a system and method for recalculating an analysis report of 3D scan data that substantially obviates one or more problems due to limitations and disadvantages of the related art.

It is an object of the present invention to provide a system and method for recalculating an analysis report of 3D scan data capable of defining a connection between analysis results of 3D scan data and supplemental geometry and various measurements or geometric tolerances generated by the supplemental geometry, and when the scan data is modified, the analyzed data is recalculated in real time according to the related data.

To accomplish the above objective and other advantages, there is provided a recalculating system for defining a relation between analysis results of 3D scan data and recalculated analysis results in real time when the scan data is modified, the recalculating system including a scanner for detecting 3D scan data of scan objects; a user interface for displaying the data scanned by the scanner in terms of numerical data and image data, and inputting data for modifying the scan data; an analyzer for detecting the scan data entities to be modified according to scan data modification data inputted through the user interface; a control unit for defining the scan data entities so that the scan data scanned by the scanner has a graphical structure, analyzing the scan data to prepare an analysis results report including numerical and image data, and recalculating numerical and image data of the analysis results report from the scan data entities inspected in the analyzer; and a data storage unit for storing numerical and image data of scan data defined by the control unit.

The scan data entity includes at least one of: a supplemental geometry, measurement, geometric tolerance, shape variation, planar variation, boundary variation, or image.

The scan data entity includes entity properties showing the generated data of an entity; flag data showing whether a scan data entity is to be recalculated; and reference data showing relationships between scan data entities and connected higher and lower entities.

The scan data entity further includes screen display data showing a captured image to be included in the analysis results report as an entity to be outputted on-screen.

The control unit renews images of analysis results from the scan data entities to be recalculated, and the renewed scan data entities renew the analysis results report.

To accomplish the above object and other advantages, there is provided a recalculating method for defining a relation between analysis results of 3D scan data and recalculating analysis results in real time when the scan data is modified, the recalculating method including: defining entities for the scanned data of objects scanned by the scanner to have a graph structure by means of the control unit, and analyzing the scanned data to prepare an analysis results list having numerical and image data outputted through the user interface; inspecting entities from the scan data through the analyzer when modifications to the scan data are detected, and detecting and recalculating scan data entities to be modified and scan data entities connected to the graph structure of the scan data entities to be modified through the control unit; determining, through the control unit, whether modifications to images displayed through the user interface from the recalculated scan data entities are required; and initializing the recalculated scan data entities through the control unit when modifications are made to the image after determining that modifications to the displayed image is required, renewing image data, and preparing a renewed results report.

The scan data entities include displaying entity properties for showing generated data of the entities; displaying flag data for showing whether the scan data entities are to be recalculated; and displaying reference data for showing the relationship between the scan data entities and higher and lower entities thereof.

The flag data of the entities are set when the scan data is modified.

When the scan data entities are captured as images included in the analysis results report, outputting the entity to be displayed on-screen is further included.

The detection of at least one entity for recalculation from the scan data entities; clustering detected entities for recalculation; and initializing the clustered entities and preparing an analysis results report including numerical and image data from the scan data.

In re-preparing the analysis results report, only an on-screen entity from the clustered entities when an image is captured is detected and the image is renewed.

The re-prepared analysis results report captures and displays the renewed image, and the renewed image data is saved.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF THE PREFERRED EMBODIMENTS

Reference will now be made in detail to a preferred embodiment of the present invention.

Figure 1:
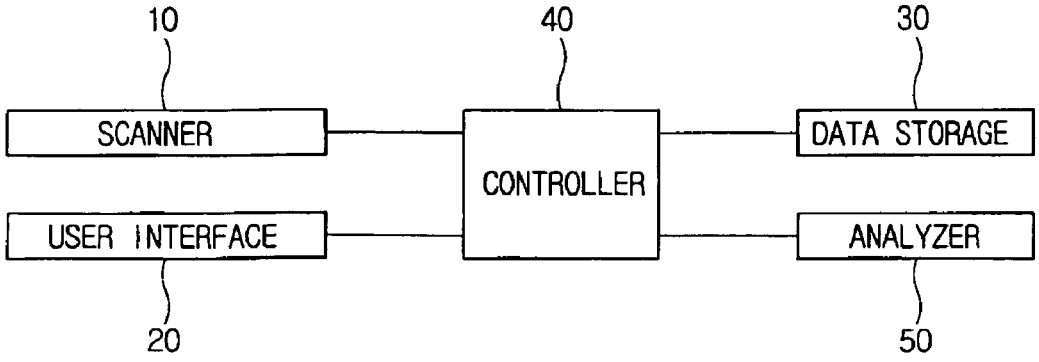
FIG. 1 is a block diagram showing a structure of a system for recalculating analysis reports of 3D scan data according to the present invention.

FIG. 1 is flowchart showing a system for recalculating scan data according to the present invention.

Referring to FIG. 1, the system for recalculating scan data includes: a scanner(10) for detecting the 3D scan data of an object by 3-dimensionally scanning a scan object; a user interface(20) for displaying scan data of the object scanned by the scanner(10) in terms of numerical values and image data, and inputting data to modify the scan data; an analyzer (50) for analyzing entities for scan data according to modification data for the scan data inputted from the user interface(20) or substitution data for new scan data, and searching for entities to be modified; a control unit(40) for recalculating entities of the scan data to regenerate an analyzed results report using the entities of the scan data to be modified, which are detected from the analyzer(50), after forming a graph structure by defining the entities of the scan data detected from the scanner(10), and generating the analyzed results report including numerical values and image data by analyzing the scan data according to a predetermined test criteria; and a data storage unit(30) for storing an analyzed results report including numerical values and image data of the scan data generated from the control unit(40).

Here, the entity data of the scan data includes geometric symbol components of geometric data having such as a point, line, circle, plane, cylinder, or sphere and data for various inspection lists that are derived from the geometric data. The various search lists derived from the geometric data are: measurement, geometric tolerance, structural variation, planar variation, boundary variation, or data relating to image, etc.

The control unit(40) defines scan data entities using the data detected from the scanner(10). That is, numerical values are defined for relationships, positions, etc. between geometric elements such as a point, line, curved line, plane, etc., and information for high level entities, to which the entities refer, are defined.

The scan data entities include reference data including properties of entities showing data related to the generation of the scan data; flag data showing if the scan data entities are entities to be recalculated; and reference data showing data relating to higher and lower entities from the entity data relating to the scan data entities.

Figure 2:
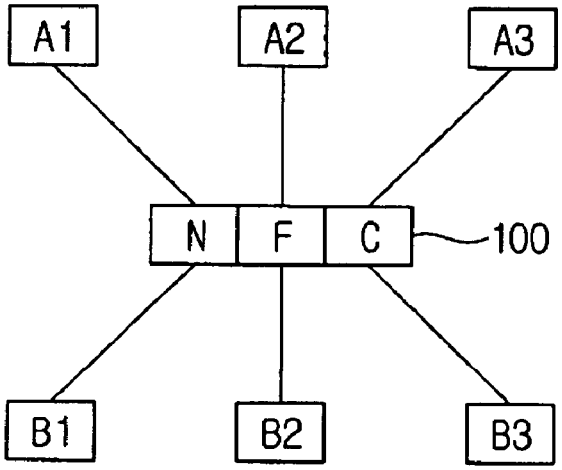
FIG. 2 is a block diagram showing an entity structure of scan data.

FIG. 2 is a block diagram showing an entity structure for recalculating scan data according to the present invention. Referring to FIGS. 1 and 2, the entities(100) defined in the control unit(40) include entity properties data (N) for showing the names of the scan data entities and entity position data in terms of coordinate values; flag data (F) for showing whether the entities(100) of the geometric data are entities to be recalculated; and reference data (C) for showing the number of entities relating to the higher entities among the entity data relating to the entities(100) of the geometric data.

Here, the entities(100) may be generated with reference to at least one defined entity (A1, A2, and A3) in a higher level, and the generated entities are higher reference entities in order to generate at least one lower entity (B1, B2, and B3).

The properties data (N) of the entities shows the coordinate values, geometric data, etc. of the entities(100).

The flag data (F) shows entities requiring recalculation when entities(100) set from the beginning have been altered thereafter so that they need to be recalculated. For entities requiring recalculation, the flag data (F) value is "1"; and for entities not requiring recalculation, the flag data (F) value is "0". If needed, the flag data (F) value can be changed.

The reference data (C) shows the number of higher entities that are influenced or referenced when entities(100) are generated.

Figure 3:
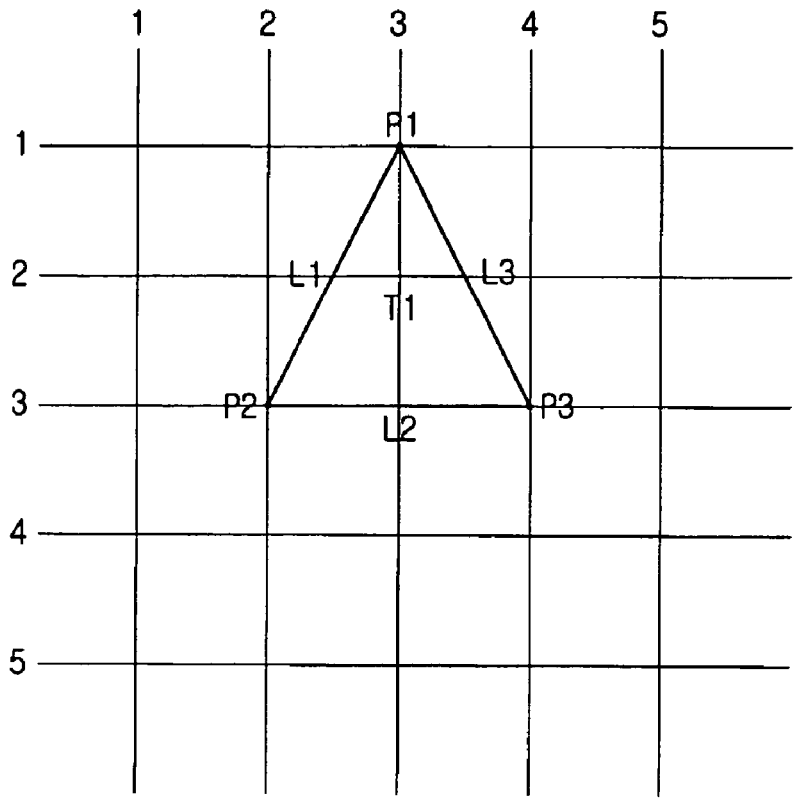
FIG. 3 is an exemplary diagram showing a captured image when the analysis report is generated.
Figure 4:
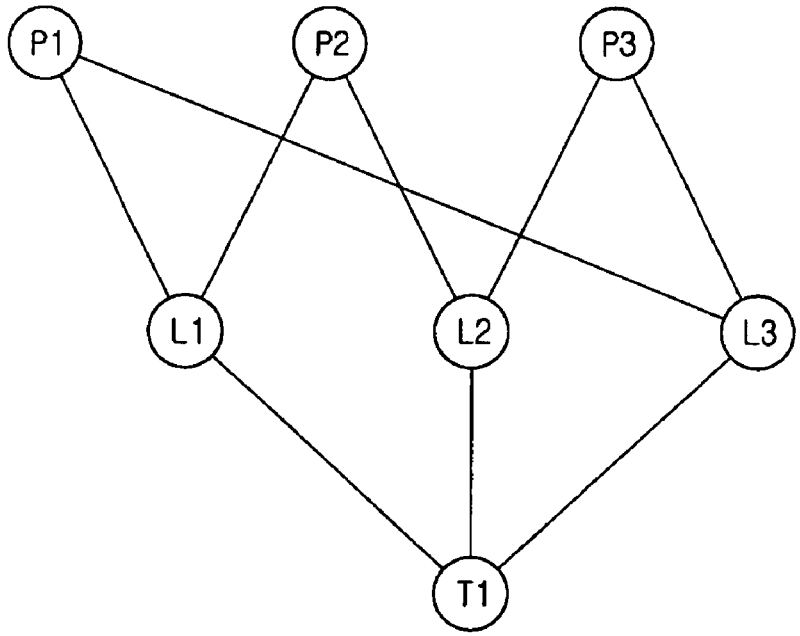
FIG. 4 is a flowchart showing reference relationships for recalculating the analysis results of FIG. 3.

FIG. 3 is an exemplary diagram showing a reference data model in order to recalculate geometric data, according to the present invention, and FIG. 4 is a flowchart showing reference relationships for recalculating the reference data of FIG. 3. Entities(100) will be explained in further detail with reference to FIGS. 2 through 4.

For example, entities(100) are defined in the following manner and are mapped respectively when defined scan data for a triangle (T1) are in two dimensions. In order to form triangle (T1), the following entities to form triangle (T1) include points P1, P2, and P3; a line L1 connecting points P1 and P2, a line L2 connecting P2 and P3, a line L3 connecting P1 and P3; and a triangle T1 having L1, L2, and L3.

In this instance, P1 is (P1, 1, 3, 0, 0), P2 is (P2, 3, 2, 0, 0), P3 is (P3, 3, 4, 0, 0), L1 is (P1, P2, 0, 1), L2 is (P2, P3, 0, 1), L3 is (P1, P3, 0, 1), and T1 is (L1, L2, L3, 0, 2).

Here, the entities for P1, P2, and P3 are an X coordinate value, a Y coordinate value, a flag value, and a reference value; lines L1, L2, and L3 are higher referenced entity data, a flag value, and a reference value; and T1 is higher referenced entity data, a flag value, and a reference value.

When illustrating reference relations for such entities, as shown in FIG. 4, each entity forms a mutual graph structure; and higher entities are connected with lower entities, where the higher entities are referenced when each entity is generated and the lower entities are referenced with the entity itself.

Additionally, if an image to be included in the analysis results report is captured, entities of the scan data may further include screen display data that confirms whether or not to display the image on the screen.

The images of the analyzed results are renewed from the entities of the scan data that are to be recalculated, and the analysis results report is renewed from the renewed scan data entities.

Referring again to FIGS. 1 and 2, the control unit(40) detects only the flag data from the entity data, making it possible to detect whether it is to be recalculated and whether an image is to be outputted to the screen, clustering only entities of scan data to be displayed on the screen, being able to renew an analysis results report including numerical values of recalculated scan data entities that have been clustered and images, and capturing and displaying the renewed images.

The entities(100) defined in the control unit(40) and the mapping data of the entities(100) are saved in the data storage unit(30).

The analyzer(50), controls the scan data entities and detects entities for recalculation when modified data for the scan data from the user interface(30) or substitute data for new scan data for the scan data is inputted and modifications are made to the scan data. The analyzer(50) may detect flag data set by the modified scan data to detect entities for recalculation. The analyzer(50) may detect an entity to be recalculated by detecting flag data sets when modifications are made to the scan data.

Figure 5:
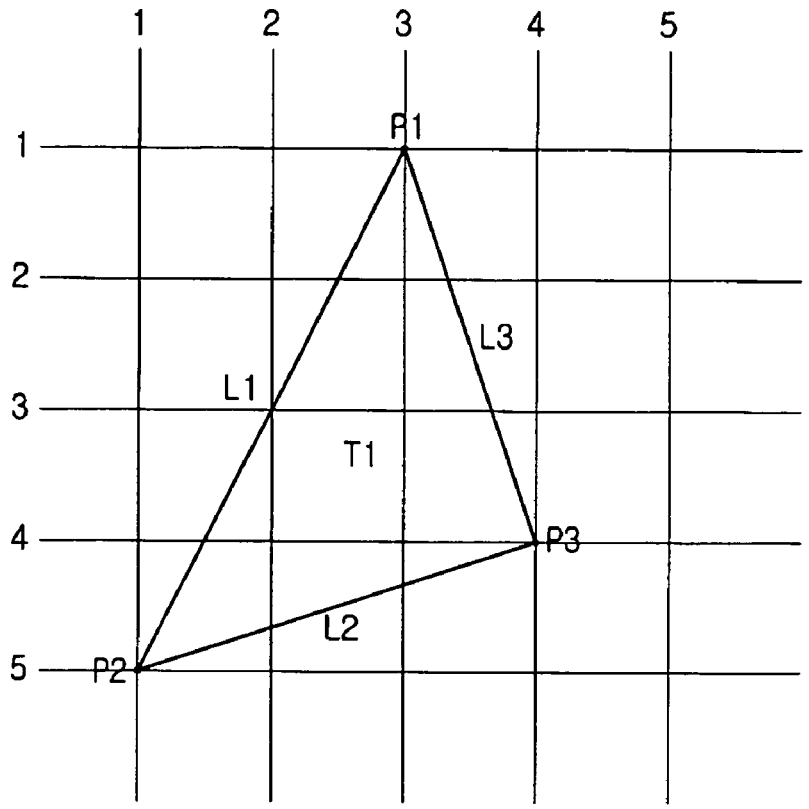
FIG. 5 is an exemplary diagram showing a modified model when the analysis results of FIG. 3 are modified.
Figure 6:
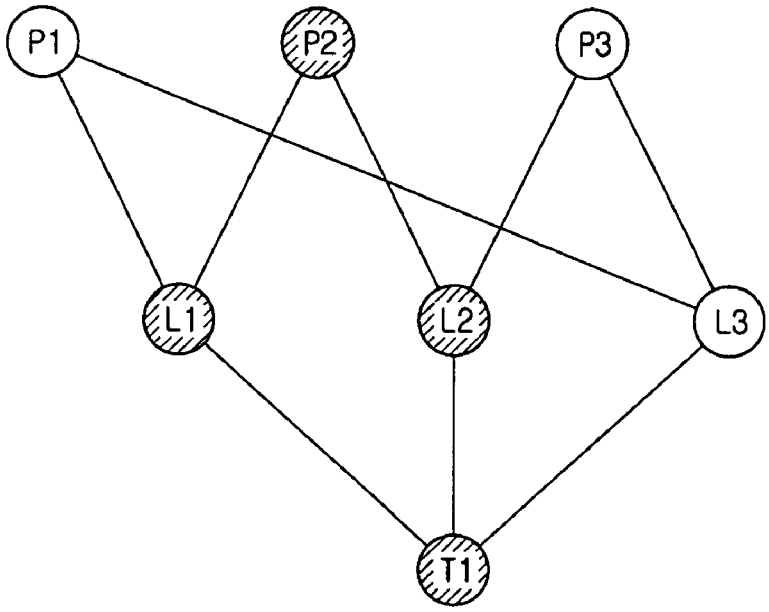
FIG. 6 is flowchart showing reference relationships of the modified analysis results of FIG. 5.

FIG. 5 is an exemplary diagram showing a modified model when the analysis results of FIG. 3 are modified, and FIG. 6 is a flowchart showing reference relationships of the modified analysis results of FIG. 5. Referring to FIGS. 5 and 6, the recalculation of entities will be further explained.

First, with reference to FIGS. 3 and 4, the three points, P1, P2, and P3 are formed, with P1 and P2 connected by line L1, P2 and P3 connected by line L2, and P1 and P3 connected by line L3. Lines L1, L2, and L3 form triangle T1. P1 is (P1, 1, 3, 0, 0), P2 is (P2, 3, 2, 0, 0), P3 is (P3, 3, 4, 0, 0), L1 is (P1, P2, 0, 1), L2 is (P2, P3, 0, 1), L3 is (P1, P3, 0, 1), and T1 is (L1, L2, L3, 0, 2).

However, if the scan data is modified or new scan data is substituted by a user, for example, if entity P2 is modified, entity P2 is (P2, 5, 1, 1, 0), entity L1 is (P1, P2, 1, 1), entity L2 is (P2, P3, 1, 1), and entity T1 is (L1, L2, L3, 1, 2). That is, if one of the higher entities from the entities connected with the graph structure is changed, then all of its lower entities are due for recalculation.

Here, the modified scan data entity reference relations, as shown in FIG. 5, due to entities P2, L1, L2, and T1 becoming entities for modification, have each entity's flag value change from "0" to "1" to become entities for recalculation. Here, each entity's flag value is set at the same time as the scan data is modified, and the analyzer(50) (in FIG. 1) detects modified entities.

The detection of the modified scan data compares the modified scan data to the original scan data, and sets the changed entity data.

Referring again to FIG. 1, the control unit(40) detects and clusters entities for modification from the flag data of entities detected by the analyzer(50), and sequentially changes the clustered entities from the higher entities downward to recalculate new geometric data.

When the lower scan data entities in the clustering process refers to a plurality of higher scan data entities, not all of the higher scan data entities that the lower scan data entity referred to are to be recalculated. That is, when higher entities are to be recalculated, the lower entities below them are to be recalculated, which is not necessarily true in the opposite case.

A recalculating method for geometric data according to the present invention will now be explained with reference to FIGS. 1 and 7.

In step S100, scan objects are scanned by the scanner(10), and the control unit(40) defines entities from the scanned results in a graph structure and generates scan data entities and a graph structure in step S110, which defines scan data entities as follows. Taking an example where the data generated from the scan data is shown, the entities' position data are shown, the scan data entities are modified and indicated by flag data whether or not to be recalculated, the entities' reference data is shown to display the scan data entities and the relationships between higher and lower entities connected in the graph structure, and the scan data is interconnected through the aforementioned entity generating process.

In step S120, using the generated scan data entities in step S110, the control unit(40) compares the scan object to preset inspection lists and performs an analysis, preparing a results report including numerical values and image data from the analyzed results in step S120, outputting it through the user interface(20). The analysis results report is saved in step S130 in the data storage unit(30).

The various scan results inserted into the analysis results report are not a combination of simple numbers and images, but each result is a dynamic changing entity that has its data on how it was generated as parameters. Accordingly, if scan data is modified or new scan data is substituted, or if the scan values or the design values are changed when the parameters are changed, the affected results area is able to automatically be renewed.

In step S140, the control unit(40) changes the inspection criteria or design data through the user interface(20) to determine whether to modify the analysis results report values.

In step S150, when modifications to standards for inspecting scan data or design data for detecting the scan data are detected in step S140, the analyzer(50) detects entities with set flag data from the modified scan data entities.

Also, by detecting the scan data entities that display images on-screen from the modified scan data entities, when an image is captured, the entities that are displayed can be checked.

In step S160, when detection in step S 140 of entities to be modified by the analyzer(50) is completed, the control unit(40) recalculates entities for modification inspected by the analyzer(50) and scan data entities connected in a graph structure to the entities to be modified.

Figure 8:
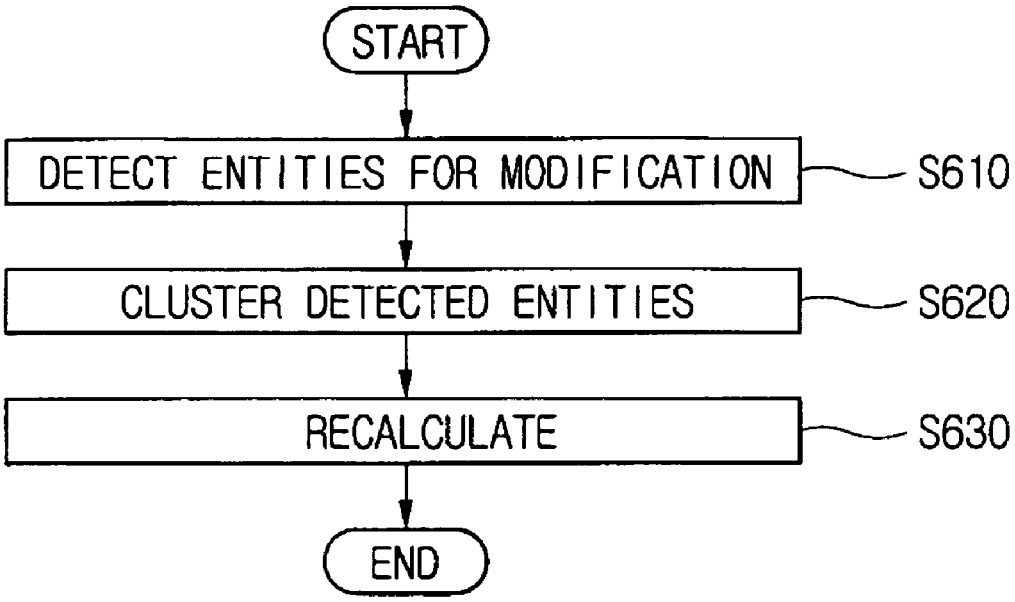
FIG. 8 is a flowchart showing the recalculation of the analysis results in further detail.

The recalculation process in step S160 will now be described in more detail with reference to FIGS. 1 and 8. In step S610 in FIG. 8, the control unit(40) detects at least one scan data entity for recalculation from the analyzer(50), and the detected scan data entities for recalculation in step S610 are clustered by the control unit(40) in step S620.

In step S630, based on the clustered scan data entities, the scan data is analyzed, and the numerical values and the image is redrawn according to the analyzed results, and the scan data analyzed results report is recalculated.

Namely, as shown in FIGS. 5 and 6, when entity P2 on the graph structure is modified, the analyzer(50) detects the flag data of entities connecting the modified scan data entities and the scan data entities to be modified.

Entity P2 is (P2, 5, 1, 1, 0), entity L1 is (P1, P2, 1, 1), entity L2 is (P2, P3, 1, 1), and entity T1 is (L1, L2, L3, 1, 2). When entity P2 is modified, position and distance data of entities L1 and L2 to be modified and the data on the area of entity T1 are recalculated. Numerical data of the scan data is generated, and the image of the scan data is renewed.

Figure 7:
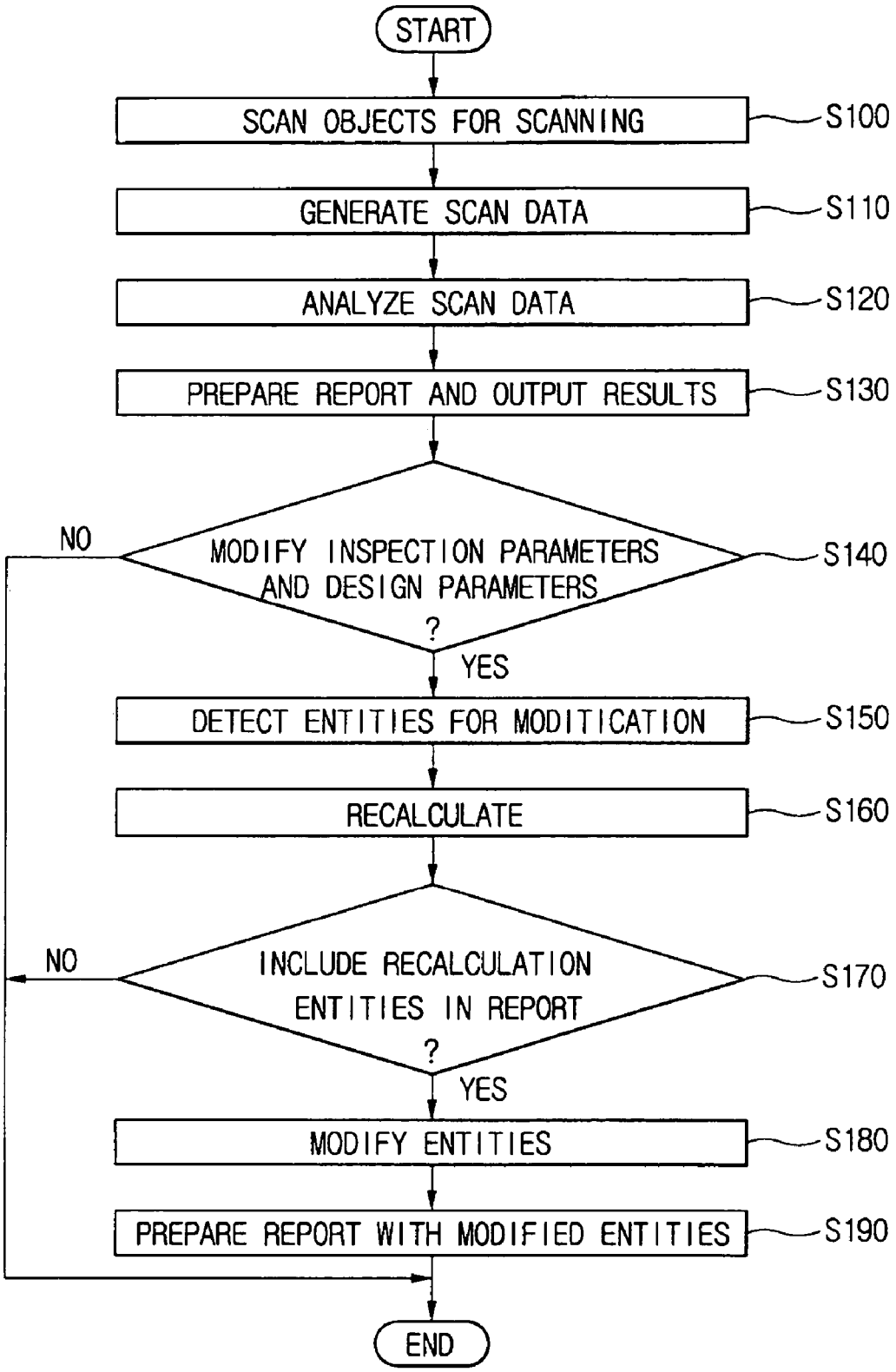
FIG. 7 is a flowchart showing the recalculating process of the analysis results of the measured 3D scan data according to the present invention.

Referring to FIGS. 1 and 7, in step S170, when recalculation in step S160 is completed, the control unit(40) determines whether displayed images have entities included when an image is captured through the user interface(20) from the modified scan data.

In step S180, the control unit(40) checks if the data which is displayed through a screen from the set flag data of the modified scan data entities is outputted to the screen; and when there are entities displayed, the control unit(40) generates and modifies a new image to reflect the confirmed entities in the image, based on the current image.

When the new image is generated, the control unit(40) captures the newly generated image, and outputs it through the user interface(20). In step S190, the recalculated numerical data and the renewed image data in step S150 is included in the analyzed results report generated in step S130 and modified.

Also, when the modification of the report is completed, the report is saved in the data storage unit(30).

When there are no scan data modifications or entities outputted on-screen in steps S140 and S170, the recalculation of the entities or updates to analyzed results reports are terminated.

Accordingly, analysis of the scan data of an object for scanning and the outputting of an image are easily performed; and when scan data is modified or new scan data is inputted, an analyzed results report of the scan data can change dynamically.

The present invention defines a connection between analysis results of scan data and supplemental geometry and various measurements or geometric tolerances generated by the supplemental geometry. When the scan data is modified, the analyzed data is recalculated in real time according to the related data; and when the scan data is altered, the repetitive task of inspection is simplified so that inspection efficiency is increased, and analysis of scan data is automated.

The foregoing embodiment is merely exemplary and is not to be construed as limiting the present invention. The present teachings can be readily applied to other types of systems and methods for recalculating analysis reports of 3D scan data. The description of the present invention is intended to be illustrative, and not to limit the scope of the claims. Many alternatives, modifications, and variations will be apparent to those skilled in the art.

What is claimed is:

1. A recalculating system for defining a relation between analysis results of 3D scan data and recalculating analysis results in real time when the scan data is modified, the recalculating system comprising:

a scanner for detecting 3D scan data of scan objects;

a user interface for displaying the data scanned by the scanner in terms of numerical data and image data, and inputting data for modifying the scan data;

an analyzer for detecting [the] scan data entities to be modified according to scan data modification data inputted through the user interface;

a control unit for defining the *scan data* entities so that the scan data scanned by the scanner has a graph structure, analyzing the scan data to prepare an analysis results report including numerical and image data, and recalculating numerical and image data of the analysis results report from the scan data entities inspected in the analyzer, *and scan data entities connected to the graph structure of the scan data entities to be modified*; and a data storage unit for storing numerical and image data of scan data defined by the control unit,

*wherein the control unit is embodied as a computer, and the analyzer is embodied in software that is operable by the computer, and*

*wherein the scan data entities correspond to geometric elements including points and lines, and the graph structure includes vertices representing the scan data entities, connected by edges representing logical relationships between the scan data entities, higher ones of the scan data entities in the graph structure connected and refer to lower ones of the scan data entities.*

2. The system of claim 1, wherein the scan data entity includes:

entity properties showing generation data of an entity;

flag data showing whether a scan data entity is to be recalculated; and reference data showing relationships between the scan data entities and connected higher and lower entities.

3. The system of claim 2, wherein the scan data entity further includes screen display data showing whether the entity is to be outputted on-screen when a captured image is to be included in the analysis results report.

4. The system of claim 1, wherein the scan data entity includes at least one of: a supplemental geometry, measurement, geometric tolerance, shape variation, planar variation, boundary variation, and image.

5. The system of claim 1, wherein the control unit renews images of analysis results from the scan data entities to be recalculated, and the renewed scan data entities renew the analysis results report.

6. A recalculating method for defining a relation between analysis results of 3D scan data and recalculating analysis results in real time when the scan data is modified, the recalculating method comprising:

a) defining entities for scanned data of objects scanned by [the] *a* scanner to have a graph structure by means of [the] *a* control unit *implemented by a controller*, and analyzing the scanned data to prepare an analysis results [list] *report* having numerical and image data [outputted], *and displaying the analysis results report* through [the] *a* user interface;

b) inspecting entities from the scan data [through the analyzer] when modifications to the scan data are detected in the step a, and detecting and recalculating scan data entities to be modified, and scan data entities connected to the graph structure of the scan data entities to be modified, through the control unit;

c) determining, through the control unit, whether modifications to images displayed through the user interface from the recalculated scan data entities are required in the step b; [and]

d) renewing image data based on the recalculated scan data entities through the control unit when modifications are made to the image after determining that modifications to the displayed image is required in step c[, and];

*e*) generating a renewed *analysis* results report *having the renewed image data; and*

*f*) *displaying the renewed analysis results report through the user interface,*

*wherein the scan data entities correspond to geometric elements including points and lines, and the graph structure includes vertices representing the scan data entities, connected by edges representing logical relationships between the scan data entities, higher ones of the scan data entities in the graph structure connected and refer to lower ones of the scan data entities.*

7. The method of claim 6, wherein the scan data entities include:

displaying entity properties for showing generating data of the entities in the step a;

displaying flag data for showing whether the scan data entities are to be recalculated; and displaying reference data for showing relations between the scan data entities and higher and lower entities thereof.

8. The method of claim 7, wherein the flag data of the entities are set when the scan data is modified.

9. The method of claim 7, further including outputting the entity to be displayed on-screen when the scan data entities are captured as images is included in the analysis results report.

10. The method of claim 6, wherein the recalculation includes:

detecting at least one entity for recalculation from the scan data entities in the step b;

clustering detected entities for recalculation; and initializing the clustered entities and preparing an analysis results report including numerical and image data from the scan data.

11. The method of claim 10, wherein the re-preparing of the analysis results report includes only an on-screen entity from the clustered entities when an image is captured is detected and the image is renewed.

12. The method of claim 6, wherein the re-prepared analysis results report captures and displays the renewed image, and the renewed image data is saved in the step d.

* * * * *